(12) United States Patent
Troccoli et al.

(10) Patent No.: US 7,318,357 B1
(45) Date of Patent: Jan. 15, 2008

(54) MACHINE AND METHOD FOR ALLOWING DIFFERENT FLUID OR GAS FLOW RATES IN DIFFERENT DIRECTIONS IN A CONDUIT

(76) Inventors: Joseph Jude Troccoli, 4639 Brownleaf Dr., Old Hickory, TN (US) 37138;
Joseph Emil Troccoli, 4639 Brownleaf Dr., Old Hickory, TN (US) 37138

( * ) Notice: Subject to any disclaimer, the term of this patent is extended or adjusted under 35 U.S.C. 154(b) by 75 days.

(21) Appl. No.: 11/227,737

(22) Filed: Sep. 15, 2005

(51) Int. Cl.
*G01F 1/28* (2006.01)

(52) U.S. Cl. .................................... 73/861.74
(58) Field of Classification Search ............... 137/541; 4/325; 414/199; 73/861.74, 23
See application file for complete search history.

(56) References Cited

U.S. PATENT DOCUMENTS

| | | | |
|---|---|---|---|
| 3,104,676 A | 9/1963 | Steer | |
| 3,438,392 A | 4/1969 | Wilson | |
| 3,554,213 A | 1/1971 | Yoshino | |
| 4,135,382 A * | 1/1979 | Capone | 73/31.05 |
| 4,306,828 A * | 12/1981 | Legille et al. | 414/199 |
| 4,613,290 A * | 9/1986 | Evenson | 417/517 |
| 4,704,947 A | 11/1987 | Schneider | |
| 4,926,658 A | 5/1990 | Olsen et al. | |
| 4,971,093 A * | 11/1990 | Andersson | 137/541 |
| 5,265,438 A | 11/1993 | Knowles et al. | |
| 5,345,780 A | 9/1994 | Aaron et al. | |
| 5,507,468 A | 4/1996 | Evans | |
| 5,988,984 A | 11/1999 | Austin | |
| 6,742,540 B2 | 6/2004 | Kim | |
| 6,748,965 B2 | 6/2004 | Lee | |
| 6,854,270 B2 | 2/2005 | Zenker et al. | |
| 6,863,504 B2 | 3/2005 | Kimberlin et al. | |
| 2006/0053542 A1* | 3/2006 | Hand | 4/325 |

* cited by examiner

*Primary Examiner*—Jewel Thompson
(74) *Attorney, Agent, or Firm*—David D. Winters

(57) ABSTRACT

A machine for allowing different fluid or gas flow rates in different directions through a conduit with a freely pivotable valve element, and a valve element stop so as can provide for limited flow of a fluid or gas in one direction and full flow in the reverse direction, also allowing a feed pump to pump against its own head pressure. This permits a smaller reservoir to be used in cistern systems while not reducing pump run times below the minimum required but still allowing full flow in the opposite direction out of the tank to the end user.

4 Claims, 2 Drawing Sheets

MACHINE AND METHOD FOR ALLOWING DIFFERENT FLUID OR GAS FLOW RATES IN DIFFERENT DIRECTIONS IN A CONDUIT

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of valves and more specifically to a machine for allowing different flow rates in different directions of fluid or gas in a conduit.

In fluid delivery systems wherein fluid or gas is transferred from a reservoir to an end user, a well or cistern system, for example, there is generally a pump communicating with a tank that maintains pressure in the system. The pump is often powered by an electric motor.

It is the nature of electric motors that when they are started, a significant amount of heat is created, which heat, if not dissipated rapidly will cause damage to the motor thus decreasing its useful life span. To accomplish this desired heat dissipation, electric motors are usually equipped with cooling means that is powered by the operation of the motor itself. Thus, to be sure that the motor is sufficiently cooled after initial start-up, manufacturers generally recommend a minimum run time for each particular motor. Therefore, if an electric motor is to be used to power a pump in such a system previously described, the associated tank must be of sufficient capacity to allow the motor to run for at least its minimum recommended run time. For example, if the flow rate of a pump is 20 gallons per minute, and the minimum run time for the motor is 1 minute, then the tank must have at least a 20 gallon available void if the motor is to run for its minimum recommended run time of one minute.

Tanks and piping are expensive. So expensive, in fact, that their cost is a major obstacle to economical construction of fluid delivery systems. Economy of construction can be realized for these systems if tank sizes can be reduced and if the same conduit bearing fluid or gas into the tank may also be used to bear fluid or gas out of the tank when demanded by the end user.

Therefore, a means and method are needed to limit the flow of fluid or gas pumped towards the tank so that a smaller tank may be used without dropping below minimum pump run times, while still allowing full flow in the opposite direction out of the tank to the end user.

U.S. Pat. No. 4,926,658 by Olsen et al discloses a two way refrigerant control device for a heat pump system comprising a valve body having a plurality of axial passages and a thin annular washer-like valve member disposed in the valve body and movable to close or open the particular axial passages, this system further comprising an expansion chamber.

U.S. Pat. No. 5,265,438 by Knowles et al teaches a fluid flow circuit intended for use with heat pumps having a flow control valve comprising a pair of restrictor assemblies positioned in opposed relationship, the first restrictor assembly providing for restricted flow in one direction and unrestricted flow in the opposed opposite direction.

U.S. Pat. No. 5,345,780 by Aaron et al discloses a bi-flow expansion device wherein fluid may travel to and fro with different flow rates in each direction, this device comprising, in one embodiment, a stationary asymmetrical element within a conduit, and in a second embodiment, a movable element with a plurality of axial passages, this element free to reciprocate between a first stopping means and a second stopping means in a conduit, these first and second stopping means having different configurations such that more axial passages in the movable element will be blocked in one stopping position than in the other. In a third embodiment, Aaron, et al teaches a stationary asymmetrical element having a plurality of axial passages, one of these axial passages being blockable by a movable blocking element fixed within the stationary structure.

U.S. Pat. No. 4,704,947 by Schneider teaches a valve for regulating the bi-directional flow of fluid wherein the flow resistance in one direction can be increased, this valve comprising a spool member slidably mounted within the valve, and a bias means that must be overcome to move the valve so that flow may be restricted.

U.S. Pat. No. 3,554,213 by Yoshino discloses a bi-directional valve that splits a flow of fluid into two streams traveling in one direction and combines the two streams of fluid into one stream when traveling in the opposite direction. Yoshino further teaches slidable spools within a fluid passageway.

U.S. Pat. No. 5,988,984 by Austin teaches a valve device to be placed between a pump and a pressure reservoir in a fluid delivery system, this device comprising a diaphragm and a spring.

U.S. Pat. No. 3,438,392 by Wilson discloses a valve construction allowing flow in opposite directions comprising a first element adjustable to allow a range of flow from a maximum to complete shut off and a second element biased toward complete shut off position.

U.S. Pat. No. 3,104,676 by Steer teaches a multidirectional valve comprising a biasing element. Steer further teaches means to completely shut off flow.

U.S. Pat. No. 5,507,468 by Evans teaches a bi-directional flow control valve comprising multiple flow restrictors and a means to cause phase changes of the fluid passing through this valve.

U.S. Pat. No. 6,863,504 B2 by Kimberlin et al and U.S. Pat. No. 6,742,540 B2 by Kim disclose bi-directional control devices which allow for pressure relief and for the complete cut off of flow of fluid in a particular direction.

U.S. Pat. No. 6,748,965 B2 by Lee teaches a double directional check valve and flow restrictor comprising a T-shaped housing, a spring, and a plurality of poppet valve arms. Lee further teaches completely shutting off a flow of fluid and dividing a flow stream into separate streams.

U.S. Pat. No. 6,854,270 B2 by Zenker et al teaches a valve that divides a flow into separate streams and completely shuts off the flow of fluid in a particular direction.

In contrast to Olsen et al (U.S. Pat. No. 4,926,658), the present art is more simple in design and construction comprising, for example, no plurality of axial passages in a cylindrical body nor an expansion chamber. In further contrast, the instant disclosure teaches allowance of substantially full flow in one direction but lesser restricted flow in the opposite direction these flow rates being dependent upon position of the pivotable valve only, but, Olsen teaches variance of flow rate from one direction of flow to another requiring communication with the axial passages of a thin washer-like valve element that blocks particular annular passages when flow is in one direction and different annular passages when flow direction is the opposite. In further contrast to the instant art, Olsen et al teaches no adjustability of the flow rate in a particular direction.

In contrast to Knowles et al (U.S. Pat. No. 5,265,438), the instant disclosure teaches no plurality of restrictor assemblies. In further contrast to Knowles et al, the instant art recites one pivotable valve element rather than two slidable valve elements taught by Knowles et al. Furthermore, the instant disclosure is more simple in design and construction and so may be fabricated with greater economy of labor and material than Knowles et al.

In contrast to these embodiments of Aaron et al (U.S. Pat. No. 5,345,780), the present art teaches no asymmetrical stationary member as in one embodiment of Aaron et al, no adjustability of flow rate by means of alternate blocking of axial passages in a movable element, this blocking depending upon the geometry of stop elements, nor adjustability of flow rate by means of alternately blocking or unblocking of an axial passage in an asymmetrical element by a blocking element movably fixed within this asymmetrical element.

Furthermore, the instant art is more simple than Aaron et al and may be fabricated and assembled with greater economy of labor and material than Aaron et al.

In contrast to Schneider (U.S. Pat. No. 4,704,947), the instant art teaches a pivotable valve element as opposed to the slidable spool member taught by Schneider. In addition, the present art is more simple and may be fabricated and assembled with greater economy of labor and material than Schneider. The instant art is therefore an improvement over Schneider.

In substantial contrast to Yoshino (U.S. Pat. No. 3,554,213), the instant disclosure teaches no slidable spool elements. Nor does the present disclosure teach dividing a stream into two separate streams nor combining separate streams into one stream. In further contrast to Yoshino, the instant art teaches away from completely shutting off fluid flow in any particular direction. Furthermore, the instant art lacks the complexity of design and manufacture of Yoshino so therefore may be fabricated with greater economy of labor and material than Yoshino.

In substantial contrast to Austin (U.S. Pat. No. 5,988,984), the instant disclosure teaches a valve having a movable valve element whose position may vary according to the direction of travel of the fluid through the valve by the force exerted by this fluid. Furthermore, Austin teaches a biasing element in contrast to some embodiments of the present art.

In substantial contrast to Wilson (U.S. Pat. No. 3,438,392), the instant disclosure teaches a single flow control member, this flow control member movable according to the direction of flow of a fluid through the valve by the force of this fluid moving through the valve. In further contrast to Wilson, the instant art does not teach complete shut off of fluid flow in any direction. The instant art is more simple than Wilson and may be more cheaply manufactured and assembled.

In substantial contrast to Steer (U.S. Pat. No. 3,104,676), the instant art teaches no complete shut off of fluid flow in any particular direction. In yet further contrast to Steer, the instant art discloses no stationary fluid control element having an axial passage. Furthermore, the instant disclosure is substantially more simple in design and manufacture than Steer.

In contrast to Evans (U.S. Pat. No. 3,104,676), the instant disclosure teaches one flow control element in the form of a pivotable valve element rather than a plurality of sliding valve control elements as taught by Evans. In further contrast to Evans, the instant art teaches no means to affect phase change in the fluid passing through a valve. In still further contrast to Evans, the instant art is much more simple in design and manufacture than Evans. The instant disclosure is therefore an improvement over Evans.

In contrast to Kimberlin et al (U.S. Pat. No. 6,863,504 B2) and Kim (U.S. Pat. No. 6,742,540 B2), the instant art teaches no bias means in some embodiments. In further contrast to Kimberlin et al and Kim, the instant art teaches away from allowing pressure relief. In further contrast to Kimberlin et al and Kim, the instant art does not teach complete shut off of flow in a particular direction.

In substantial contrast to the instant art, Lee (U.S. Pat. No. 6,748,965 B2) teaches a plurality of valve control elements. In further contrast to the present art, Lee teaches the complete cutting off of fluid in a particular direction. In still further contrast to the instant disclosure, Lee teaches dividing a stream of fluid into two streams. In further contrast to Lee, the instant art is less complex and may be fabricated and assembled with greater economy of labor and material than Lee.

In contrast to the instant art, Zenker et al (U.S. Pat. No. 6,854,270 B2) teaches splitting a stream of fluid into two streams. In further contrast to the instant art, the Zenker disclosure is much more complex in design and manufacture than the instant art.

BRIEF SUMMARY OF THE INVENTION

The primary object of the invention is to allow limited flow of a fluid or gas in a conduit in one direction and full flow of a fluid or gas in a conduit in the reverse direction.

Another object of the invention is to allow a pump to pump against its own head pressure.

Another object of the invention is to allow a well system or the like to employ a smaller tank.

A further object of the invention is to allow a pump of intermittent operation to run a sufficient length of time to cool.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for allowing different flow rates in different directions of fluid or gas in a conduit.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

LIST OF COMPONENTS

Figure 1:
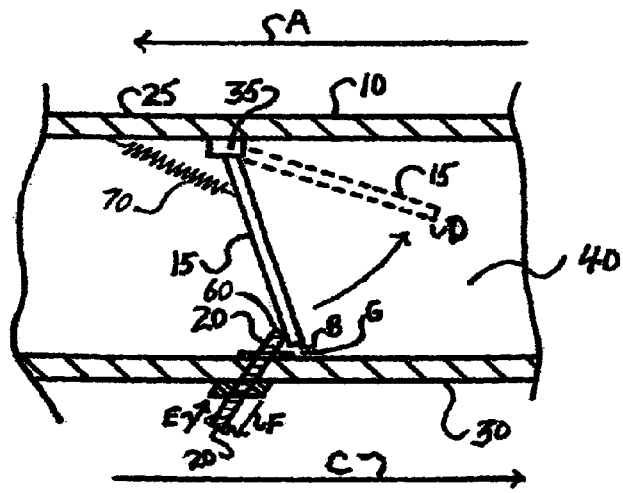
FIG. 1 is a side cross sectional side view of the device.

10 Conduit
15 Valve element, flapper mode
16 Valve element, butterfly mode
17 Valve element, poppet head mode
20 Adjustable valve element stop
25 Top side of conduit
30 Bottom side of conduit
35 Pivotable mount
40 Conduit passageway
45 Opening through the valve element
50 Hole plug
60 Valve element seat
65 Mounting means for biasing means
70 Biasing means

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Turning now to FIG. 1 we see a machine allowing flow of fluid or gas in different directions at different rates comprising a conduit (10) with a top side (25) and bottom side (30), this conduit having an interior passage (40) through which fluid or gas may flow in either direction. In addition, we also see a freely moving valve element (15) pivotably attached to the top side of the conduit by a pivotable means (35) well known to anyone familiar with the art, this valve element as depicted in FIG. 1 acting in the manner of a flapper valve. We further see a screw adjustable valve element stop (20), movable in direction E or direction F, which moves a valve element seat (60) against which the valve element (15) may rest so that a gap (G) between the valve element (15) and the bottom side (30) of the conduit (10) may be created. Also shown is an optional biasing means (70) that may be installed on either side of the valve element (15) to bias it toward a closed position B or an open position D.

Looking again at FIG. 1, we note that when fluid or gas flows through the conduit (10) in direction A, the valve element (15) will be forced into position B. We further note that the adjustable valve element stop (20) may be moved in direction E or direction F. If the adjustable valve element stop (20) is moved in direction E, the gap G between the bottom side (30) of conduit (10) and the valve element (15) increases, thereby increasing the flow allowed by the valve element (15) when fluid or gas flows in direction A.

But, if the adjustable valve element stop (20) is moved in direction F, the gap between the bottom side (30) of the conduit (10) and the valve element (15) decreases. This decreases the rate of flow in direction A of fluid or gas allowed by the valve element (15). Thus, when fluid or gas flows in direction A, the flow rate may be controlled by judicious adjustment of the valve stop (20).

Turning again to FIG. 1, we see that when fluid or gas flows through the conduit (10) in direction C, the valve element (15) will pivot into position D, thus the flow in direction C will be substantially unrestricted. Though the herein described valve element (15) acts in the manner of a flapper valve, the valve element (15) may also be contrived, to act after the fashion of a butterfly valve as in FIG. 4.

Figure 3:
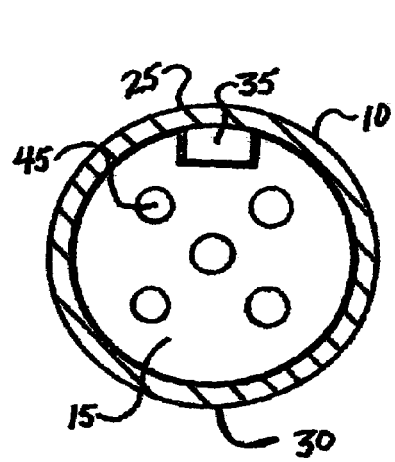
FIG. 3 is a cross sectional front view of an alternate embodiment of the device using a flapper valve configuration.
Figure 2:
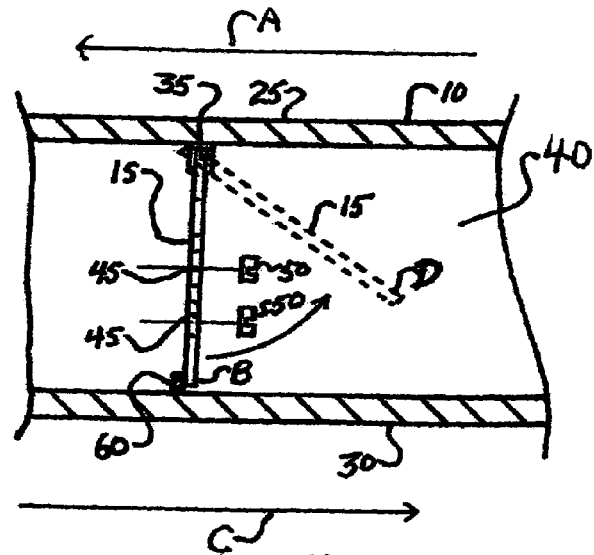
FIG. 2 is a cross sectional side view of an alternate embodiment of the device using a flapper valve configuration.

Looking now at FIG. 2 and FIG. 3, we see an alternate form of the device comprising a conduit (10) having a top side (25), a bottom side (30), the top side comprising a pivotable mounting means (35) for a valve element (15), this valve element having one or more openings through it (45) and the conduit further comprising a valve element seat (60) and a passageway (40) through which fluid or gas may flow. In addition, we see hole plugs (50). The biasing means (70) illustrated in FIG. 1 is omitted.

With this arrangement, when the fluid or gas travels through the conduit (10) in direction A, the freely pivoting valve element (15) will be forced into position B against the valve element seat (60), so that flow rate through the conduit (10) is restricted to that allowed by the area of the one or more openings (45) in the valve element (15).

Also, we note that inserting the hole plugs (50) into the one or more openings (45) through the valve element (15) will decrease the flow rate allowed by the valve element (15) while removing hole plugs (50) from the one or more openings (45) in the valve element (15) will increase the flow rate allowed by the valve element (15). Thus, the rate of flow in direction A is adjustable. Furthermore, we understand that openings (45) may be added to the valve element (15) or openings (45) already in the valve element (15) may be increased or decreased in size to adjust the flow rate allowed by the valve element (15) in direction A without employing hole plugs (50).

Turning again to FIG. 2, we see that when fluid or gas flow through the conduit (10) is in direction C, the freely movable valve element (15) will pivot into position D so that the flow of fluid or gas through the conduit (10) in direction C will be substantially unrestricted. Again, while the valve element (15) as depicted in FIG. 2 and FIG. 3, and as previously described, acts in the manner of a flapper valve, the valve element (15) could, alternatively, be contrived to act after the fashion of a butterfly valve.

It is to be understood that though the conduit (10) and the valve element (15) depicted in FIG. 3 is substantially circular, the conduit (10) and/or valve element (15) may comprise any geometric configuration and that indeed there are numerous other such geometric configurations that will allow a greater range of motion of the valve element (15) held pivotably within the conduit (10).

Figure 4:
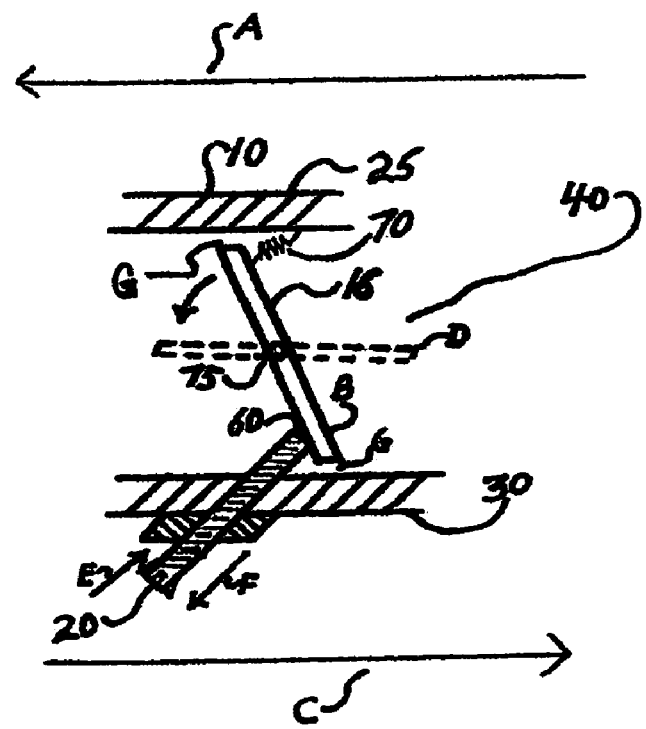
FIG. 4 is a cross sectional side view of the device in using a butterfly valve configuration

Looking now at FIG. 4, we see an alternate embodiment of the instant art disclosing a machine allowing flow of a fluid or gas in different directions at different rates comprising a conduit (10) with a top side (25) and a bottom side (30), this conduit comprising a passageway (40) through which fluid or gas may flow in either direction. In addition, we also see a freely moving valve element (16) pivotably attached to opposite sides of the conduit, not shown, by a pivotable means (75) well known to anyone familiar with the art of butterfly valves, this valve element (16) as depicted in FIG. 4 acting in the manner of a butterfly valve. We further see a screw adjustable valve element stop (20) having a valve element seat (60), movable in direction E or direction F, against which the valve element (16) may rest so that gaps (G) between the valve element (16) and the bottom side (30) and top side (25) of the conduit (10) may be created.

Looking again at FIG. 4, we note that when fluid or gas flows through the conduit (10) in direction A, the valve element (16) will be forced into position B. We further note that the adjustable valve element stop (20) may be moved in direction E or direction F. If the adjustable valve element stop is moved in direction E, the gaps (G) between the bottom side (30) and top side (25) of conduit (10) and the valve element (16) increase, thereby increasing the flow allowed by the valve element (15) when fluid or gas flows in direction A.

But, if the adjustable valve element stop (20) is moved in direction F, the gaps between the bottom side (30) and top side (25) of the conduit (10) and the valve element decrease. This decreases the rate of flow in direction A of fluid or gas allowed by the valve element. Thus, when fluid or gas flows in direction A, the flow rate may be controlled by judicious adjustment of the valve stop (20).

Turning again to FIG. 4, we see that when fluid or gas flows through the conduit (10) in direction C, the valve element (16) will pivot into position D, thus the flow in direction C will be substantially unrestricted.

It is to be understood that the conduit (10) and the valve element (16) may comprise various geometric configurations.

The butterfly valve element (16) as depicted in FIG. 4 is pivotably mounted by pivotable mounting means (75) oriented substantially equidistant from the top side (25) of the conduit (10) and the bottom side (30) of the conduit (10) and incorporating a means of biasing the valve element (16) toward a certain position B, such that fluid flow from direction A will tend to open the valve toward position D, but fluid flow from direction C will tend to close the valve toward position B. Alternatively or additionally, the pivotable mounting means (75) may be orientated substantially off-center relative to the conduit passageway (40) in order that a greater surface area of the valve element (16) may be concentrated to one side of these pivotable mounting means (75). Thus, the valve element (16) will tend to open or close according to the direction of flow of fluid in the conduit (10).

Figure 5:
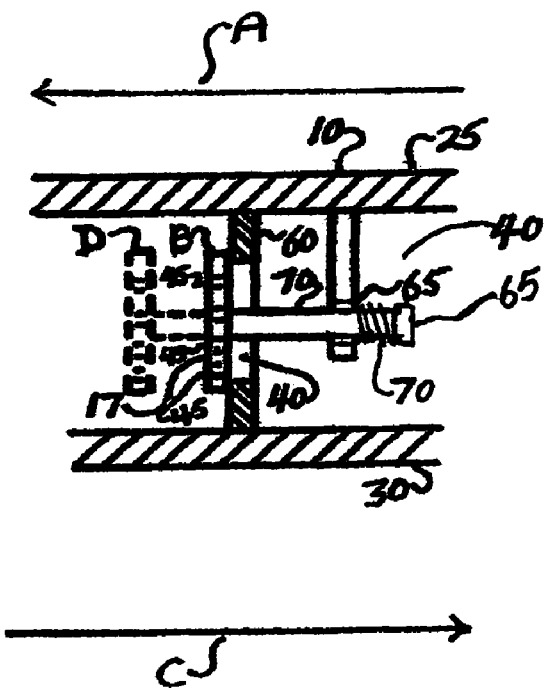
FIG. 5 is a cross sectional side view of the device in a poppet valve configuration.

Looking now at FIG. 5, we see still another embodiment of the instant art disclosing a valve acting after the fashion of a poppet comprising a conduit (10) having a top side (25), a bottom side (30), and a passageway (40) through which fluid or gas may flow in either direction at different rates, a valve element (17) comprising openings (45), an optional biasing means (70), a mounting structure (65) for the biasing means (70) so that the valve element (17) will function after the fashion of a poppet head, and a valve element seat (60) extending around the inner circumference of the conduit (10). A valve element stop (not illustrated) may be easily incorporated into the valve element seat (60).

Looking further at FIG. 5, we see that when the valve element (17) is in position B fast against the valve element seat (60) and the direction of flow through the conduit (10) is direction C, the rate of flow will be restricted to that allowed by the area of the openings (45) through the valve element (17), but that when the valve element is in position D, not fast against the valve element seat (60), and the direction of flow through the conduit (10) is direction A, the flow through the conduit (10) will be substantially unrestricted. It is to be understood that the flow of fluid or gas through the passageway (40) will create force against the valve element (17) and tend to move it in the direction of flow. It is to be further understood that the valve element may be biased in either position B or D by the optional biasing means (70).

While the invention has been described in connection with a preferred embodiment, it is not intended to limit the scope of the invention to the particular form set forth; but on the contrary, it is intended to cover such alternatives, modifications, and equivalents as may be included within the spirit and scope of the invention as defined by the appended claims.

What is claimed is:

1. A machine for allowing different flow rates of fluid or gas in different directions in a conduit comprising;
    one or more valve element(s) openably and closeably positioned within a conduit,
    one or more valve element seat(s),
    one or more valve element stop(s),
    a means of allowing reverse flow past the valve element(s) wherein the valve element(s) comprise one or more opening(s) through said valve element(s).

2. A machine for allowing different flow rates of fluid or gas in different directions in a conduit comprising;
    one or more valve element(s) openably and closeably positioned within a conduit,
    one or more valve element seat(s),
    one or more valve element stop(s),
    a means of allowing reverse flow past the valve element(s) wherein the size(s) of said one or more opening(s) may be governed or controlled by the user.

3. A method for allowing different flow rates of fluid or gas in different directions through a conduit by providing at least;
    one or more valve element(s) openably and closeably positioned within a conduit,
    one or more valve element seat(s),
    and
    one or more valve element stop(s),
    wherein is also provided in the one or more valve element(s), one or more openings through said valve element(s).

4. A method for allowing different flow rates of fluid or gas in different directions through a conduit by providing at least;
    one or more valve element(s) openably and closeably positioned within a conduit,
    one or more valve element seat(s),
    and
    one or more valve element stop(s),
    wherein is also provided in the one or more valve element(s), one or more openings through said valve element(s), the size(s) of which may be governed or controlled by the user.

* * * * *